(12) United States Patent
Rocca-Serra

(10) Patent No.: US 11,359,685 B2
(45) Date of Patent: *Jun. 14, 2022

(54) FRICTION SET FOR RAILWAY BRAKING SYSTEM

(71) Applicant: TALLANO TECHNOLOGIE, Boulogne Billancourt (FR)

(72) Inventor: Christophe Rocca-Serra, Paris (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 93 days.

This patent is subject to a terminal disclaimer.

(21) Appl. No.: 16/634,182

(22) PCT Filed: Jul. 31, 2018

(86) PCT No.: PCT/FR2018/051971
§ 371 (c)(1),
(2) Date: Jan. 27, 2020

(87) PCT Pub. No.: WO2019/025723
PCT Pub. Date: Feb. 7, 2019

(65) Prior Publication Data
US 2020/0149601 A1   May 14, 2020

(30) Foreign Application Priority Data
Aug. 1, 2017 (FR) ..................... 17 57392

(51) Int. Cl.
*F16D 65/00* (2006.01)
*B61H 5/00* (2006.01)
(Continued)

(52) U.S. Cl.
CPC ........... *F16D 65/0031* (2013.01); *B61H 5/00* (2013.01); *F16D 55/22* (2013.01); *F16D 65/095* (2013.01)

(58) Field of Classification Search
CPC ............. F16D 65/0031; F16D 55/2245; F16D 65/095; F16D 55/22; B61H 5/00
See application file for complete search history.

(56) References Cited

U.S. PATENT DOCUMENTS

| 10,935,092 B2 * | 3/2021 | Rocca-Serra ....... F16D 65/0031 |
| 2014/0116824 A1 | 5/2014 | Jakubowski et al. |
| 2015/0122601 A1 * | 5/2015 | Rocca-Serra ......... F16D 55/225 188/218 A |

FOREIGN PATENT DOCUMENTS

| CN | 201610911 U * | 10/2010 |
| EP | 2725255 A1 | 4/2014 |

(Continued)

OTHER PUBLICATIONS

International Search Report, dated Oct. 1, 2018, from corresponding PCT application No. PCT/FR2018/051971.
(Continued)

*Primary Examiner* — Pamela Rodriguez
(74) *Attorney, Agent, or Firm* — Nixon & Vanderhye

(57) ABSTRACT

Disclosed is a friction set for a railway disk brake system for railway rolling stock including: a shoe holder including a receiving slideway; a friction shoe including a brake pad and a profiled shape configured for being slid into the receiving slideway, where the friction shoe includes a pneumatic conduit connecting a first space delimited by a first surface of the friction shoe to a second space delimited by a second opposite surface the friction shoe; a through hole arranged in the shoe holder and laid out so as to be facing the pneumatic conduit; and a pneumatic connector mounted on the shoe holder, pneumatically connected with the through hole, extending away from the friction shoe and rotationally mobile relative to the shoe holder, around an axis perpendicular to a main plane of the shoe holder.

18 Claims, 4 Drawing Sheets

(51) Int. Cl.
*F16D 55/22* (2006.01)
*F16D 65/095* (2006.01)

(56) References Cited

FOREIGN PATENT DOCUMENTS

| | | | |
|---|---|---|---|
| EP | 2816250 A1 | * | 12/2014 |
| FR | 2938626 A1 | | 5/2010 |
| GB | 2 260 173 A | | 4/1993 |
| GB | 2492858 A | | 1/2013 |
| GB | 2533476 A | | 6/2016 |
| GB | 2540361 A | | 1/2017 |
| JP | 2007192268 A | * | 8/2007 |
| WO | 85/01565 A1 | | 4/1985 |
| WO | 2008/091217 A1 | | 7/2008 |
| WO | WO-2018/065541 A1 | * | 4/2018 |

OTHER PUBLICATIONS

Office Action issued in Chinese Patent Application No. 201880061115.8 dated Aug. 19, 2021.

* cited by examiner

FRICTION SET FOR RAILWAY BRAKING SYSTEM

FIELD OF THE INVENTION

The present invention relates to railway rolling stock. More specifically, the invention relates to braking of railway rolling stock and in particular the friction couples for braking systems for railway rolling stock. It will be noted that according to the invention, any object configured for rolling on rails is within the scope of the invention. Thus, the present invention applies for example equally well to trains, tramways and metropolitan light rail.

DESCRIPTION OF RELATED ART

Railway rolling stock, such as a locomotive, coach or wagon, usually comprises a braking system. Disk brakes solutions are one among many possible solutions for braking. Thus, the braking system generally comprises a disk secured to a wheel or an axle of the railway rolling stock. The braking system further comprises a friction couple which comprises a shoe holder which supports a friction shoe. The friction shoe usually comprises means for attachment to the shoe holder and a brake pad. When the driver actuates the braking system, the brake pad of the friction shoe comes into contact with the disk to exert a braking force on the disk. Thus, by friction, the friction shoe brakes the disk secured to the wheel or the axle. Generally, the railway rolling stock comprises two friction couples, arranged on either side of the disk so as to pinch, or in other words sandwich the disk, in order to compress it from both sides.

The brake pad of the friction shoe usually comprises a metal material, such as cast-iron, a frittered material or a composite material. Thus, when the brake pad of the friction shoe rubs against the disk, particles of material coming from the brake pad are released into the ambient atmosphere around the friction couple. Thus, the braking system releases atmospheric pollution in the form of more or less fine particles.

It is therefore sought to capture the particles of material released during braking, in particular by providing a blower or aspiration device, supplied by a pump, near a zone of release of particles coming from the brake pad of the friction shoe.

However, these devices operate in an open space. In fact, the zone of release of particles coming from braking, specifically the brake pad, is not confined. This is why, the yield or effectiveness of the blower or aspiration device is relatively low. Further, it is difficult to incorporate these devices in the architecture of the railway rolling stock.

SUBJECT MATTER OF THE INVENTION

The goal of the invention is to provide a friction couple with which to more effectively capture the particles released by the brake pad and the friction shoe during the braking cycle and which is easily incorporated in the architecture of the railway rolling stock.

BRIEF SUMMARY OF THE INVENTION

To do this, according to the invention, a friction couple for a railway disk brake system for railway rolling stock with one or two directions of movement is provided where said friction couple is characterized in that it comprises:

a shoe holder comprising a receiving slideway;
a friction shoe comprising a brake pad and a profiled shape configured for being slid into the receiving slideway, where the friction shoe comprises a pneumatic conduit connecting a first space delimited by a first surface of the friction shoe to a second space delimited by a second opposite surface the friction shoe;
at least one through hole arranged in the shoe holder and laid out so as to be facing the pneumatic conduit; and
A pneumatic connector mounted on the shoe holder, pneumatically connected with the through hole and extending away from the friction shoe and rotationally mobile relative to the shoe holder, around an axis normal to a main plane of the shoe holder.

Thus, the particles released during braking can reach the pneumatic conduit of the friction shoe, and then the through hole arranged in the shoe holder. Next, they reach the pneumatic connector. Thus, by connecting the pneumatic connector, for example by means of a hose, to a system for recovery of braking particles, it is possible to connect these two. Further, since the pneumatic connector is rotationally mobile around the axis normal to the main plane of the shoe holder, it is possible to easily arrange it within the railway rolling stock.

Further, in various embodiments of the invention, use can also be made of one and/or another of the following provisions:

- the profiled shape is a dovetail;
- the friction couple comprises a hose pneumatically connected with the pneumatic connector and extending away from the friction shoe;
- the friction couple comprises a pump connected, directly or indirectly, to the hose and configured for creating reduced pressure in the through hole;
- the receiving slideway of the shoe holder is blind, specifically with one closed end and one open end forming an opening for the extraction and insertion of the friction shoe, where the friction set further comprises a removable member for locking the friction shoe in the receiving slideway;
- the friction shoe comprises a first member and a second member configured for being slid in the receiving slideway until contact of each other in an area of butting of the first and second members while leaving a passage therebetween so as to form the pneumatic conduit;
- the first and second members each form one half of the friction shoe;
- the friction shoe can also be single piece;
- the first and second members are juxtaposed in a direction tangential to a breaking disk of the railway rolling stock;
- the passage left at the interface of the first and second members is arranged in an intermediate part of the butting zone;
- the butting zone is substantially defined as a butting plane, the first and second members have similar lengths in a longitudinal direction of the shoe holder, and the through hole has a center defining an axis separated from the butting plane by at least 5 mm or coincident with the butting plane;
- the friction set comprises a pneumatic junction ring laid out in the pneumatic conduit forming a pneumatic guide between the through hole of the shoe holder and the pneumatic conduit;

the pneumatic junction ring comprises a flange resting on a bottom of the receiving slideway and a cylindrical portion;

the cylindrical portion has a height equivalent to a height of the dovetail profiled shape.

According to the invention, a railway disk brake system can finally be provided for railway rolling stock with two directions of movement comprising a disk secured to an axle or a wheel and two friction couples as previously described and arranged on either side of the disk.

Also according to the invention, a friction couple for a railway disk brake system for railway rolling stock with one or two directions of movement is provided where said friction couple is characterized in that it comprises:

a shoe holder comprising a receiving slideway;

a friction shoe comprising a brake pad and a profiled shape configured for being slid into the receiving slideway, where the friction shoe comprises a pneumatic conduit connecting a first space delimited by a first surface of the friction shoe to a second space delimited by a second opposite surface the friction shoe;

at least one through hole arranged in the shoe holder and laid out so as to be facing the pneumatic conduit; and a pneumatic junction ring laid out in the pneumatic conduit forming a pneumatic guide between the through hole of the shoe holder and the pneumatic conduit of the friction shoe.

Thus, the friction shoe comprises a pneumatic conduit which forms, with the through hole arranged in the shoe holder, a pneumatic circuit with which to aspirate the particles released, by the brake pad of the friction shoe, during braking. Further, the pneumatic junction ring serves to guide the particles coming from braking from the pneumatic conduit of the friction shoe to the through hole of the shoe holder. The pneumatic junction ring therefore serves to limit possible leaks out of the pneumatic circuit. In particular, the junction ring serves to limit the quantity of particles coming from braking which slide in an interstice located between the friction shoe and the shoe holder. The friction set according to the invention therefore serves to aspirate a larger quantity of particles coming from braking for the same aspiration force. It is therefore more effective. The friction couple according to the invention therefore serves to simply lay out a pneumatic circuit for removing the particles from braking.

Further, in various embodiments of the invention, use can also be made of one and/or another of the following provisions:

the profiled shape is a dovetail;

the pneumatic junction ring comprises a flange resting on a bottom of the receiving slideway and a portion which preferably has a conical shape; with this arrangement the pneumatic guide can be shaped simply;

more generally it will be noted that the portion can have any type of shape and can in particular have an arbitrary shape;

the conical portion is cylindrical;

the conical portion has a height equivalent to a height of the profiled shape; with this configuration, the particles coming from braking can be effectively guided from the pneumatic conduit of the friction shoe towards the through hole of the shoe holder;

the receiving slideway of the shoe holder is blind, specifically with one closed end and one open end forming an opening for the extraction and insertion of the friction shoe, where the friction couple further comprises a removable member for locking the friction shoe in the receiving slideway; thus, the friction shoe can be easily replaced if necessary; the maintenance of the friction couple is therefore easier;

the friction shoe is shaped by a first member and a second member configured for being slid in the receiving slideway until contact of each other in an area of butting of the first and second members while leaving a passage therebetween so as to form the pneumatic conduit;

the first and second members each form one half of the friction shoe; the passage left at the interface of the two friction shoes is formed in a central part of the zone of release of particles released during braking; the aspiration of the particles released during braking is therefore done in the same way regardless of the travel direction of the railway rolling stock; the pneumatic behavior for removal of the particles released during braking is consequently simpler to model;

the first and second members are juxtaposed in a direction tangential to a braking disk of the railway rolling stock;

the passage left at the interface of the first and second members is arranged in an intermediate part of the butting zone; it involves a simple fitting;

the butting zone is substantially defined as a butting plane; the first and second members have similar lengths in a longitudinal direction of the shoe holder, and the through hole has a center defining an axis separated from the butting plane by less than 5 mm or coincident with the butting plane; the aeraulic behavior of the friction couple is therefore symmetric, which is advantageous since the railway rolling stock has two directions of motion;

the friction couple comprises a pneumatic connector mounted on the shoe holder, pneumatically connected with the through hole and extending away from the friction shoe; the pneumatic connector serves to direct the particles coming from the pneumatic circuit formed by the conduit of the friction shoe and the through hole arranged in the shoe holder to a collection member which has a filter;

the pneumatic connector is rotationally mobile relative to the shoe holder, around an axis normal to a main plane of the shoe holder; the friction set can therefore be easily incorporated in a braking system of the railway rolling stock; further, this mounting tolerates relative movements substantial amplitude;

the friction couple comprises a hose pneumatically connected with the through hole and extending away from the friction shoe;

the friction couple comprises a pump connected, directly or not, to the hose and configured for creating reduced pressure in the through hole; the friction couple therefore serves to aspirate the particles coming from braking, through the pneumatic circuit formed by the pneumatic conduit of the friction shoe and the through hole arranged in the shoe holder.

According to the invention, a railway disk brake system can also be provided for railway rolling stock with two directions of movement comprising a disk secured to an axle or a wheel and two friction sets as previously described and arranged on either side of the disk.

It will further be noted that features of the friction couple comprising the junction ring and the friction couple comprising the pneumatic connector can of course be combined.

BRIEF DESCRIPTION OF THE DRAWINGS

As a nonlimiting example, four embodiments of the invention are now going to be described with the help of the following figures.

DETAILED DESCRIPTION OF FOUR EMBODIMENTS OF THE INVENTION

Figure 1:
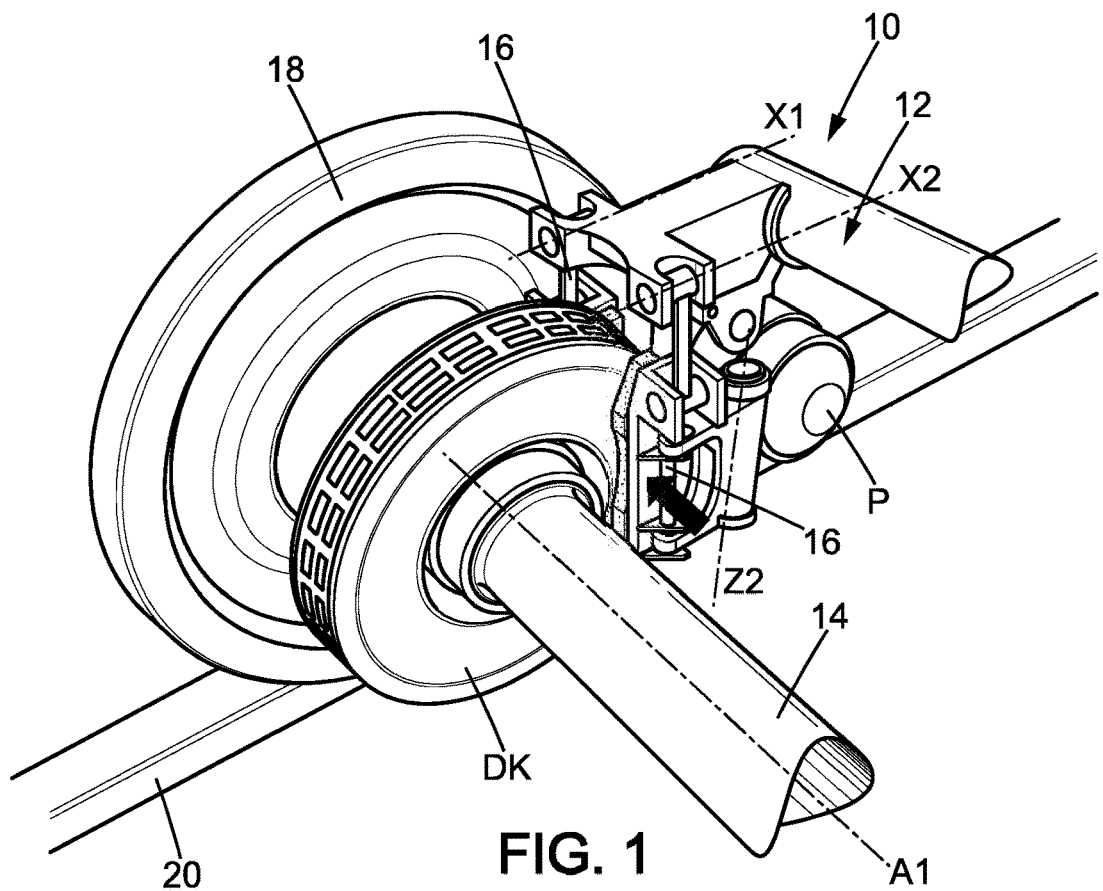
FIG. 1 is a perspective view of a railway disk brake system according to the invention.

FIG. 1 shows a portion of railway rolling stock 10 comprising a railway disk brake system 12 according to the invention. In this embodiment, the railway rolling stock 10 is a train. It will just the same be noted that the invention can be implemented in any type of railway rolling stock 10. It can therefore be metropolitan light rail or even a tramway. Similarly, the railway rolling stock 10 can be a locomotive or coach.

The railway rolling stock 10 comprises an axle 14 which comprises a main axis A1, a disk DK and a wheel 18. The wheel 18 is arranged on a rail 20 relative to which it can move by rotation around the axis A1. The axle 14, the disk DK and the wheel 18 are secured such that the axle 14 is able to transmit a rotational movement, around the main axis A1, to the disk DK and to the wheel 18. The railway rolling stock 10 has two directions of movement. The wheel 18 can therefore move on the rail 20 in two opposite directions relative to each other (see S1, S2 on FIG. 2).

Figure 2:
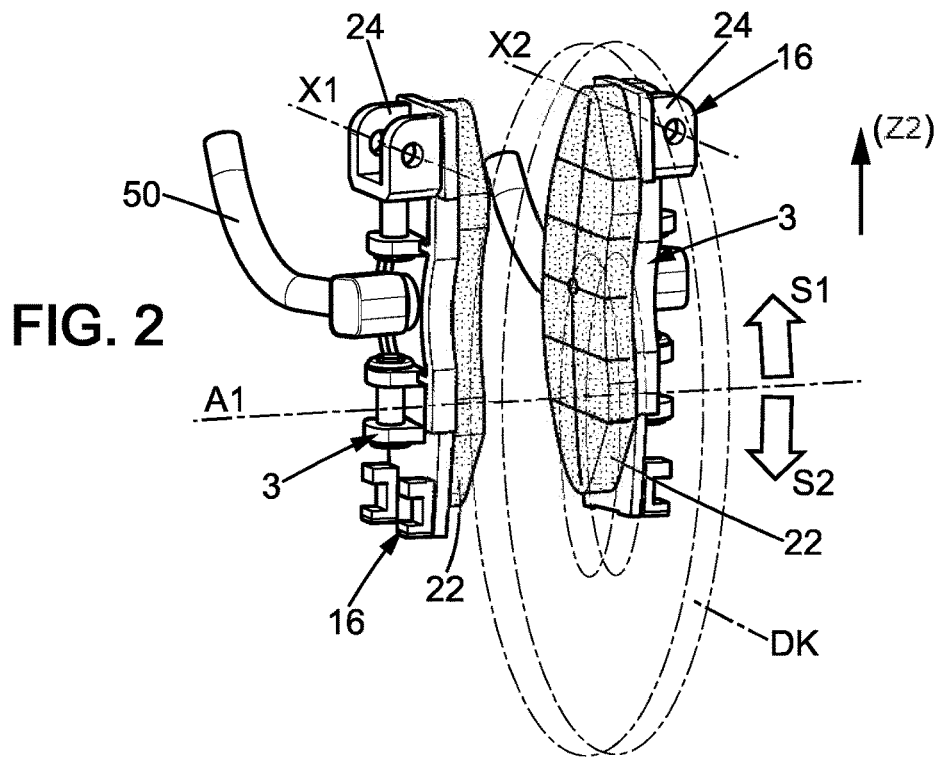
FIG. 2 is a perspective view of two friction couples according to the invention.

Further, the railway disk brake system 12 is able to exert pressure on the disk DK and to do so in order to brake the rotation of the wheel 18 around the main axis A1 and therefore consequently brake a movement of the railway rolling stock 10 on the rails 20. To do this, the railway disk brake system 12 comprises two friction couples 16 arranged on either side of the disk DK. These two friction couples 16 can be actuated by a hydraulic or pneumatic actuator so as to exert a symmetric braking force on the disk DK. FIG. 2 in particular shows the disposition of the two friction couples 16 on either side of the disk DK shown in dash-dot lines.

Figure 3:
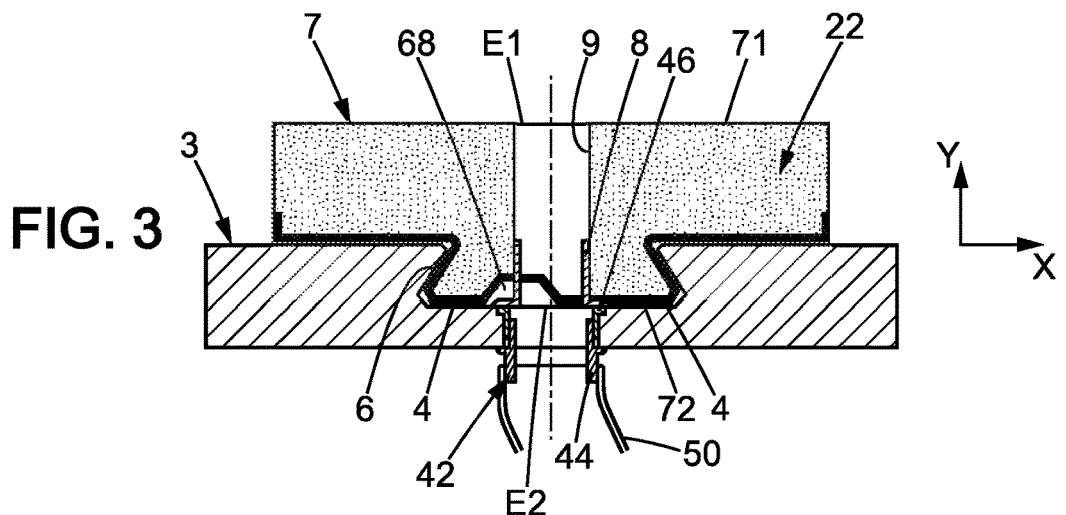
FIG. 3 is a section view of the friction couple along a plane normal to a longitudinal axis of the friction shoe.
Figure 4:
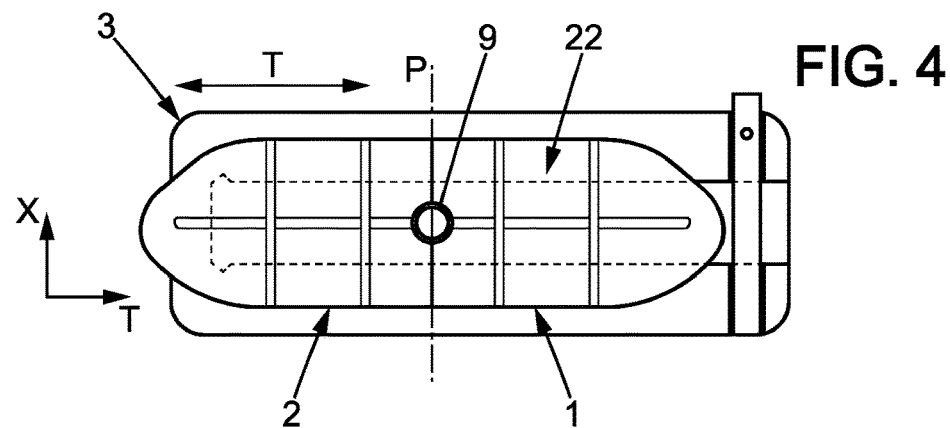
FIG. 4 is a top view of the friction set.

Thus, as shown in FIGS. 2 to 4 in particular, each friction couple 16 of the railway disk brake system 12 has a longitudinal axis Z2 shown in FIG. 1, which is coincident with a tangential direction T of the disk DK, and comprises a shoe holder 3 which supports a friction shoe 22. The friction shoe 22 is intended to enter into direct contact with the disk DK.

Further, as shown in FIGS. 3 and 4, each friction assembly 16 comprises a transverse axis X and an axis called vertical Y, where Y is normal to the friction plane (Y is normal to the friction plane).

The shoe holder 3 comprises, at the upper longitudinal end thereof as seen in FIG. 2, means for attachment 24 to a body of the railway rolling stock 10. These attachment means 24 are in the form of two through holes, arranged across from each other, thus forming a respective axis X1, X2 for receiving a complementary attachment means borne by the body of the railway rolling stock 10. The axes X1, X2 are normal to the axis A1 and the axis Z2. The axes X1, X2 are substantially parallel to the direction of movement of the railway rolling stock on the rails in the example shown.

Further, the shoe holder 3 comprises a receiving slideway 4 which extends longitudinally the length of the shoe holder 3 and which serves to receive the friction shoe 22. As noted in FIG. 5, the receiving slideway 4 is blind. That way, it comprises one closed end 41 and one open end 40. The function of this open end 40 is to form an opening for extraction and insertion of the friction shoe 22. In order to position the friction shoe 22 in the receiving slideway 4, the shoe holder 3 further comprises a movable locking member 19 which takes the shape of a slender member 19 and which is substantially normal to the receiving slideway 4 so as to obstruct the open end 40 of the receiving slideway 4. The movable locking member 19 can be secured to the shoe holder 3 to trap the friction shoe 22 in the receiving slideway 4. The movable locking member 19 can be seen as a robust pin one of the branches of which comes to be housed in a complementary recessed groove arranged in the shoe holder 3.

Additionally, the shoe holder 3 comprises a through hole 38 arranged substantially in the center of the receiving slideway 4. The through hole 38 has a center which defines a main axis A8 parallel to the vertical axis Y of the friction couple 16. This main axis A8 is further normal to a main plane XY of the shoe holder 3. This axis is also normal to a main plane of the through hole 38.

As can be seen in FIG. 3, the friction shoe 22 comprises a brake pad 7 whose function is to come into contact with the disk DK. Thus, the friction shoe comprises a first surface 71 intended to enter into direct contact with the disk DK. The friction shoe 22 also comprises a dovetail profiled shape 6 which expands going away from the brake pad. Here, the profiled shape is a dovetail profiled shape 6, which means that it has a trapezoidal shape section and is further complementary to a profile of the receiving slideway 4 of the shoe holder 3. Thus, the dovetail profiled shape 6 is configured for being slid into the receiving slideway 4 of the shoe holder 3. Thus, the friction shoe 3 comprises a second surface 72, opposite the first surface 71, which is in direct contact with the bottom of the shoe holder 3. It will further be noted that according to the invention, the profiled shape can have a quadrilateral shaped section. More generally, the profiled shape can have a section which has any kind of shape.

The dovetail profiled shape 6 comprises in the example shown a longitudinal groove 68 which extends the full length of the dovetail profiled shape 6. The dovetail profiled shape 6 can be obtained from an extruded metal profiled shape cut to the needed length. The material used can be stainless steel or a high performance aluminum alloy.

Further, as notably shown in FIG. 4, the friction shoe 22 comprises a first member 1 and a second member 2 which each form one half of the friction shoe 22. More generally, they at least have similar lengths along the longitudinal axis Z2. They are configured to be slid, one after the other, in the receiving slideway 4. They are thus juxtaposed, in contact with each other, in the tangential direction T, shown in FIG. 5, of the disk DK as can be seen by superimposing FIGS. 1 and 5. The contact between the first 1 and second 2 members is made near a butting zone which is, as shown in FIG. 4, a butting plane P.

Figure 5:
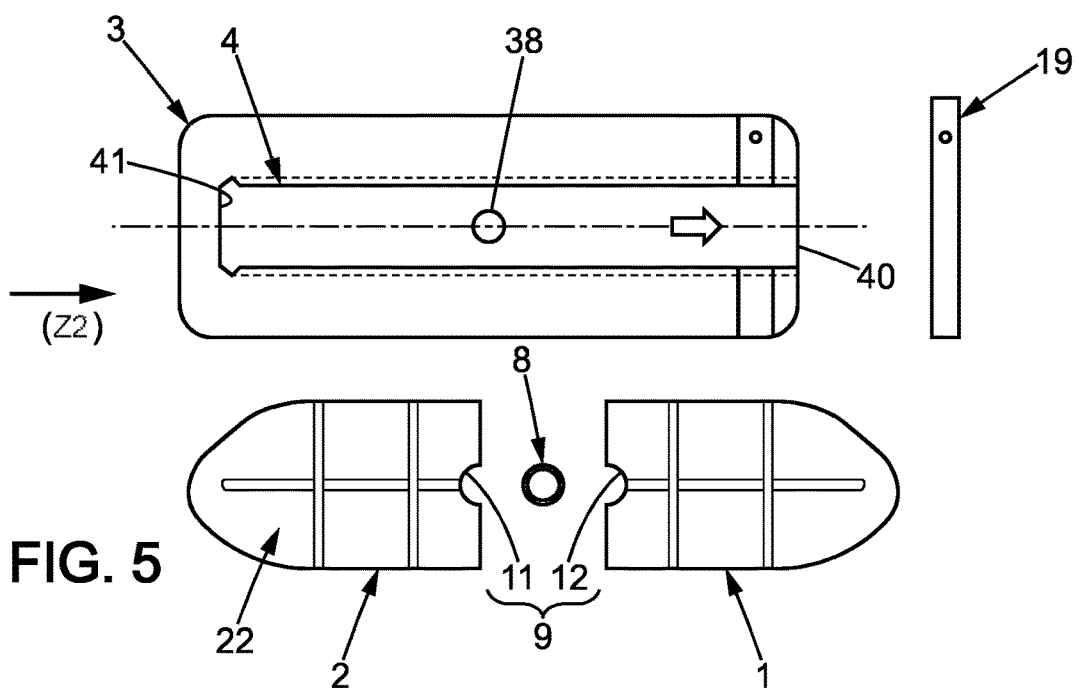
FIG. 5 is an exploded top view of the friction couple.

Further, as shown in FIG. 5, the first member 1 comprises, at the longitudinal end thereof facing the second member 2, a semicircular shaped recess 11 when it is seen from above and which extends over the entire thickness of the first member 1. Similarly, the second member 2 comprises, at the longitudinal end thereof facing the first member 1, a semicircular shaped recess 12 whose dimensions are identical to those of the recess 11 of the first member. Thus, in the area of the butting plane P between the first 1 and second 2 members, they leave a passage formed by the two recesses 11, 12 respectively of the first 1 and second 2 members. This passage is arranged in an intermediate part of the butting plane P, specifically in the middle along the transverse direction X. As shown in FIG. 3, this passage forms a pneumatic conduit 9 which makes a fluid connection between a first space E1 which is delimited by the surface 71 of the friction shoe 22 and a second space E2 which is delimited by the second surface 72 of the friction shoe 22. The through hole 38 provided in the shoe holder 3 is positioned opposite the pneumatic conduit 9. The main axis A8 of the through hole 38 lies in the butting plane P. More generally, the axis A8 of the through hole 38 is coincident with the butting plane P or else separated, or at a distance, from the butting plane of less than 5 mm. Thus, the through hole 38 and the pneumatic conduit 9 form a continuous pneumatic circuit.

Figure 6:
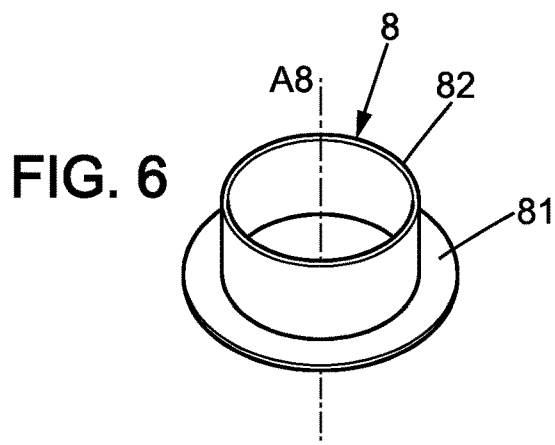
FIG. 6 is a perspective view of a pneumatic junction ring according to the invention.

The friction couple 16 also comprises a pneumatic junction ring 8 shown in particular in FIG. 6. The pneumatic junction ring 8 comprises a flange 81 which extends in an annulus transversely to the axis A8. From the interior of this flange 81 extends a conical portion, which is here a cylindrical portion 82. It will be further noted that the portion can have any kind of shape and in particular an arbitrary shape. As indicated on FIG. 3, the pneumatic junction ring 8 is positioned in the pneumatic conduit 9 such that the flange 81 rests on the bottom of the receiving slideway 4. The flange 81 is in direct contact with the surface 72 of the friction shoe 22. The cylindrical portion 82 of the pneumatic junction ring 8 extends in the inner walls of the pneumatic conduit 9 formed by the recesses 11 and 12 of the first 1 and second 2 members made without play, meaning without pneumatic leak. Further, as shown in FIG. 3, a height of the cylindrical portion 82 is equivalent to a height of the dovetail profiled shape 6 of the friction shoe 22. It will further be noted that the height of the cylindrical portion 82 is equivalent to a height of the longitudinal groove 68.

That way, the pneumatic junction ring 8 forms a pneumatic guide between the through hole 38 of the shoe holder 3 and the pneumatic conduit 9 of the friction shoe 22. In fact, a large portion of the airflow entering into the pneumatic conduit 9 from the space E1 and directed vertically downward is only able to reach the through hole 38. In fact, the pneumatic junction ring 8 limits leaks along the direction X in the interstices located between the surface 72 of the friction shoe 22 and the bottom of the receiving slideway 4 in direct contact with the surface 72 and also by the longitudinal grooves 68 of the dovetail profiled shape.

The friction couple 16 further comprises a first connector 42 arranged inside the through hole 38 of the shoe holder 3. This first connector 42 comprises a first member 44 attached to a second member 46. This attachment can in particular be an attachment by screwing or clipping. The first member 44 extends, by being away from the friction shoe 22, partially beyond the through hole 38, whereas the second member 46 is arranged in the through hole 38. The friction couple 16 also comprises a flexible hose 50 which is connected to the first connector 42. To do this, the flexible hose 50 is connected to the first member 44 of the first connector 42. Thus, the flexible hose 50 extends away from the friction shoe 22. It will also be noted that according to a variant, the first connector 42 can be formed as a single unit. In this case, the first member 44 and the second member 46 are jointly made.

In that way, the friction couple 16 comprises a pneumatic circuit comprising the pneumatic conduit 9, the pneumatic junction ring 8, the first connector 42 and the flexible hose 50. The flexible hose 50 is advantageously connected to a recovery tank for particles coming from braking. Further, the friction couple 16 comprises a pump able to create a reduced pressure in the pneumatic circuit mentioned above and in particular in the through hole 38 and a filtering element for trapping the aspirated particles.

A recovery of the particles coming from braking of the railway rolling stock 10 is now going to be described.

When the railway disk brake system 12 is actuated, the actuator is urged such that the brake pads 7 of the friction shoes 22 respectively of the two friction couples 16 enter into direct contact with the disk DK. Consequently, because of the friction between the disk DK which is rotating and the brake pad 7, particles coming from braking are released by the brake pads 7 into the space E1.

Simultaneously, a reduced pressure is created in the pneumatic circuit formed by the pneumatic conduit 9, the pneumatic junction ring 8, the first connector 42 and the flexible hose 50.

The reduced pressure can be created by a pump, for example a vacuum pump, or Venturi system near the braking system or at a distance therefrom.

Thus, the particles coming from braking, initially in the space E1, reach the pneumatic conduit 9. Next, they reach the pneumatic junction ring 8, the first connector 42 and the flexible hose 50 for reaching the tank for recovery of braking particles. As previously indicated, the pneumatic junction ring 8 prevents braking particles from reaching the interstices arranged between the surface 72 of the friction shoe 22 and the bottom of the receiving slideway 4 in direct contact with the surface 72. A significant quantity of particles coming from braking are thus recovered. The friction couple according to the invention is therefore less polluting.

Three other embodiments of the invention are now going to be described with the help of FIGS. 7 to 11. Only the differences from the first embodiment are going to be covered explicitly. The numeric references for identical objects remain unchanged.

Figure 7:
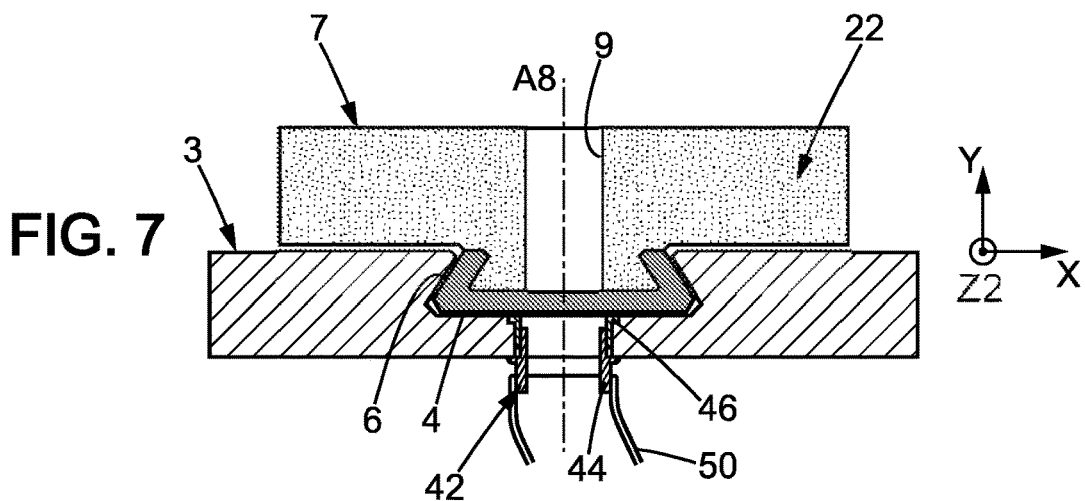
FIG. 7 is a section view of a friction couple, according to a second embodiment of the invention, along a plane normal to a longitudinal axis of a friction shoe.
Figure 8:
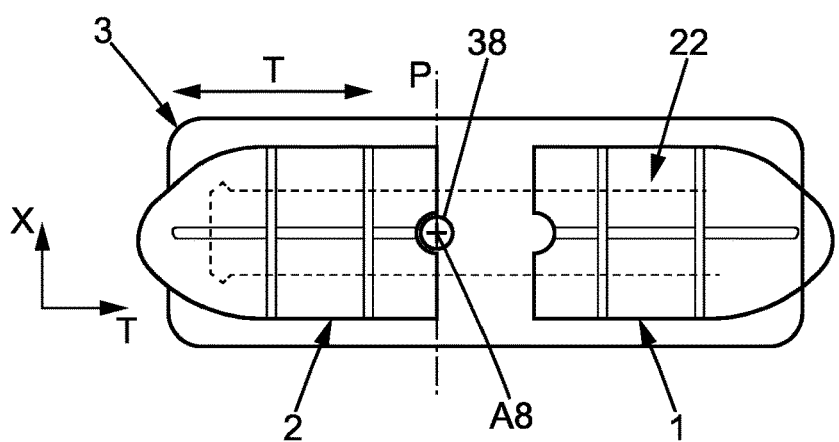
FIG. 8 is a top view of the friction couple, according to this second embodiment.
Figure 9:
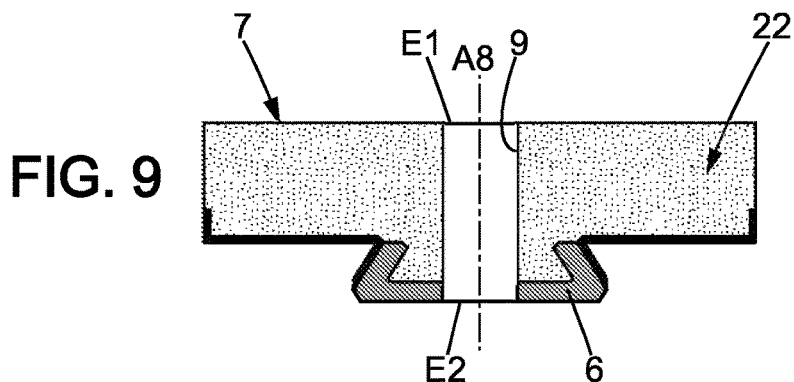
FIG. 9 is a section view of a friction shoe of the friction couple according to the second embodiment along a plane normal to a longitudinal axis of the friction shoe.

According to the second embodiment shown in FIGS. 7 to 9, the dovetail profile structure 6 of the brake pad 7 does not comprise the longitudinal groove 68 shown in FIG. 3.

Figure 10:
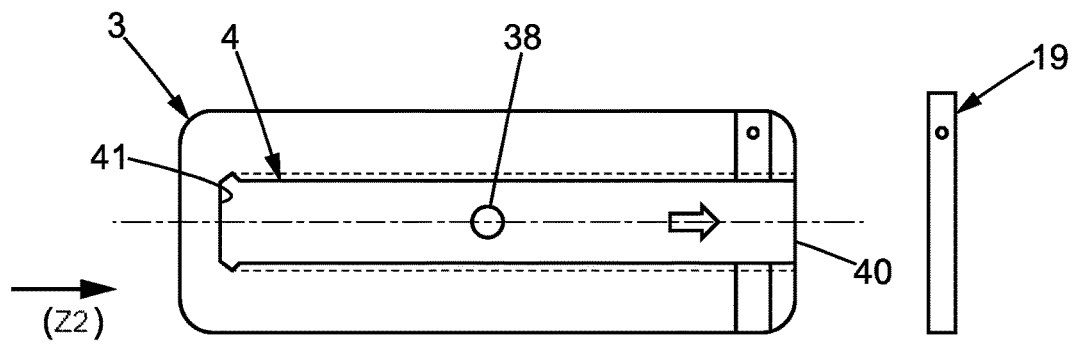
FIG. 10 is a section view of a friction couple, according to a third embodiment of the invention, along a plane normal to a longitudinal axis of a friction shoe.

According to a third embodiment shown in FIG. 10, the friction shoe 22 can be unitary.

Figure 11:
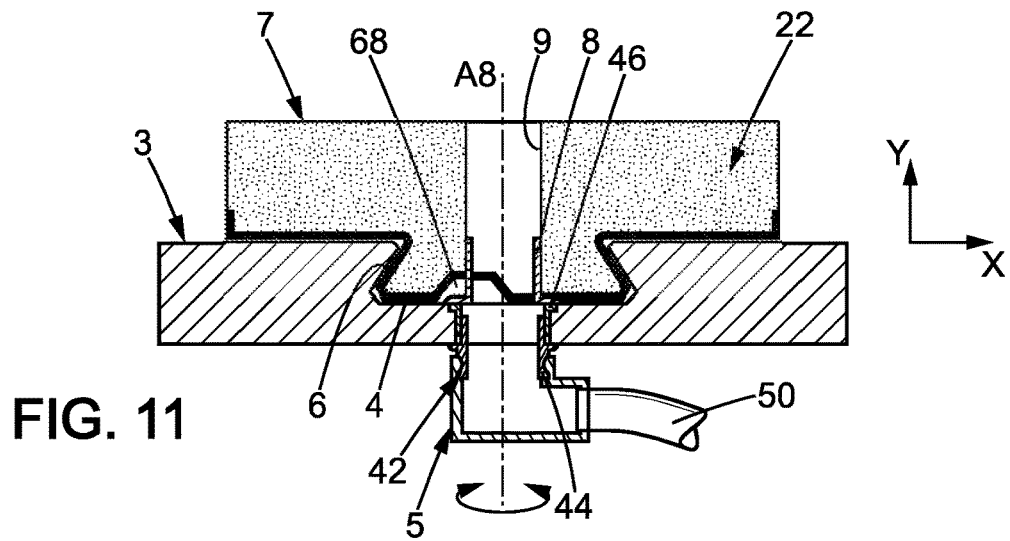
FIG. 11 is a top view of a friction couple according to a fourth embodiment of the invention.

A friction couple 16 according to a fourth embodiment of the invention is shown in FIG. 11. The friction couple 16 comprises a pneumatic connector 5 mounted on the first member 44 of the first connector 42. The positioning of the pneumatic connector 5 relative to the first member 44 is done by screwing or clipping. Thus, the pneumatic connector 5 is mounted on the shoe holder 3 and extends away from the friction shoe 7.

The pneumatic connector 5 is therefore pneumatically connected with both the through hole 38 arranged in the shoe holder 3 and also the flexible hose 50. The flexible hose 50 extends away from the friction shoe 22 relative to the pneumatic connector 5. Further, the pneumatic connector 5 is rotatable relative to the shoe holder 3 and to the friction shoe 22 around the axis A8 which is, as indicated above, normal to the main plane XY of the shoe holder 3 as shown by the arrow placed near the pneumatic connector 5.

Thus, the pneumatic connector 5 is more easily incorporated in the architecture of the railway rolling stock 10. In fact, it allows orienting the flexible hose 50 relative to the axis A8.

It will be noted that the features of the various embodiments of the invention can be combined, in so far as they are not mutually incompatible.

Further, many modifications can of course be made to the invention without going out of the scope thereof.

Notably, the friction shoe 22 can comprise several members 1, 2. For example, the friction shoe 22 can comprise three or four members 1, 2.

Similarly, the shoe holder 3 can be non-unitary and comprise several distinct members.

The shoe holder 3 can comprise at least two through holes 38.

The invention claimed is:

1. A friction set (16) for a railway disk brake system (12) for railway rolling stock (10) with one or two directions of movement (S1, S2) is provided where said friction set (16) comprises:
   a shoe holder (3) comprising a receiving slideway (4);
   a friction shoe (22) comprising a brake pad (7) and a profiled shape (6) configured for being slid into the receiving slideway (4), where the friction shoe (22) comprises a pneumatic conduit (9) connecting a first space (E1) delimited by a first surface (71) of the friction shoe (22) to a second space (E2) delimited by a second opposite surface (72) of the friction shoe (22);
   - at least one through hole (38) arranged in the shoe holder (3) and laid out so as to be facing the pneumatic conduit (9);
   a pneumatic connector (5) mounted on the shoe holder (3), pneumatically connected with the through hole (38), extending away from the friction shoe (22) and rotationally mobile relative to the shoe holder (3), around an axis (A8) perpendicular to a main plane (XY) of the shoe holder (3); and
   a pneumatic junction ring (8) laid out in the pneumatic conduit (9) forming a pneumatic guide between the through hole (38) of the shoe holder (3) and the pneumatic conduit (9),
   wherein the pneumatic junction ring (8) comprises a flange (81) which extends in an annulus transversely to the axis (A8) of the through hole (38), and from the interior of the flange (81) extends a conical portion in inner walls of the pneumatic conduit (9).

2. The friction set (16) according to claim 1 comprising a hose (50) pneumatically connected with the pneumatic connector (5) and extending away from the friction shoe (22).

3. The friction set (16) according to claim 2 comprising a pump (P) connected to the hose (50) and configured for creating reduced pressure in the through hole (38).

4. The friction set (16) according to claim 3, wherein the receiving slideway (4) of the shoe holder (3) is blind, specifically with one closed end (41) and one open end (40) forming an opening for the extraction and insertion of the friction shoe (22), where the friction set (16) further comprises a removable member for locking (19) the friction shoe (22) in the receiving slideway (4).

5. The friction set (16) according to claim 3, wherein the friction shoe (22) comprises a first member (1) and a second member (2) configured for being slid in the receiving slideway (4) until contact of each other in an area of butting of the first (1) and second (2) members while leaving a passage therebetween so as to form the pneumatic conduit (9).

6. The friction set (16) according to claim 3, wherein the friction shoe (22) is unitary.

7. The friction set (16) according to claim 2, wherein the receiving slideway (4) of the shoe holder (3) is blind, specifically with one closed end (41) and one open end (40) forming an opening for the extraction and insertion of the friction shoe (22), where the friction set (16) further comprises a removable member for locking (19) the friction shoe (22) in the receiving slideway (4).

8. The friction set (16) according to claim 2, wherein the friction shoe (22) comprises a first member (1) and a second member (2) configured for being slid in the receiving slideway (4) until contact of each other in an area of butting of the first (1) and second (2) members while leaving a passage therebetween so as to form the pneumatic conduit (9).

9. The friction set (16) according to claim 2, wherein the friction shoe (22) is unitary.

10. The friction set (16) according to claim 1, wherein the receiving slideway (4) of the shoe holder (3) is blind, specifically with one closed end (41) and one open end (40) forming an opening for the extraction and insertion of the friction shoe (22), where the friction set (16) further comprises a removable member for locking (19) the friction shoe (22) in the receiving slideway (4).

11. The friction set (16) according to claim 10, wherein the friction shoe (22) comprises a first member (1) and a second member (2) configured for being slid in the receiving slideway (4) until contact of each other in an area of butting of the first (1) and second (2) members while leaving a passage therebetween so as to form the pneumatic conduit (9).

12. The friction set (16) according to claim 10, wherein the friction shoe (22) is unitary.

13. The friction set (16) according to claim 1, wherein the friction shoe (22) comprises a first member (1) and a second member (2) configured for being slid in the receiving slideway (4) until contact of each other in an area of butting of the first (1) and second (2) members while leaving a passage therebetween so as to form the pneumatic conduit (9).

14. The friction set (16) according to claim 13, wherein the first (1) and second (2) members each form one half of the friction shoe (22).

15. The friction set (16) according to claim 14, wherein the butting area is substantially defined as a butting plane (P), the first (1) and second (2) members have similar lengths in a longitudinal direction (Z2) of the shoe holder (3), and the through hole (38) has a center defining an axis (A8) coincident with the butting plane (P).

16. The friction set (16) according to claim 13, wherein the butting area is substantially defined as a butting plane (P), the first (1) and second (2) members have similar lengths in a longitudinal direction (Z2) of the shoe holder (3), and the through hole (38) has a center defining an axis (A8) coincident with the butting plane (P).

17. The friction set (16) according to claim 1, wherein the friction shoe (22) is unitary.

18. A railway disk brake system (12) for railway rolling stock (10) with one or two directions of movement (S1, S2) comprising a disk (DK) secured to an axle (14) or a wheel (18) and two friction sets (16) according to claim 1 arranged on either side of the disk (DK).

* * * * *